(12) United States Patent
Cheng et al.

(10) Patent No.: US 11,790,944 B2
(45) Date of Patent: Oct. 17, 2023

(54) HEAT-ASSISTED MAGNETIC RECORDING HEAD NEAR-FIELD TRANSDUCER WITH A PLASMONIC DISK

(71) Applicant: Seagate Technology LLC, Fremont, CA (US)

(72) Inventors: Yuhang Cheng, Edina, MN (US); Tae-Woo Lee, Eden Prairie, MN (US); Michael A Seigler, Eden Prairie, MN (US); Yang Wu, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/807,260

(22) Filed: Jun. 16, 2022

(65) Prior Publication Data
US 2022/0415354 A1   Dec. 29, 2022

Related U.S. Application Data

(60) Provisional application No. 63/215,881, filed on Jun. 28, 2021.

(51) Int. Cl.
| | | |
|---|---|---|
| *G11B 13/08* | (2006.01) | |
| *G11B 5/31* | (2006.01) | |
| *G11B 5/60* | (2006.01) | |
| *G11B 5/00* | (2006.01) | |

(52) U.S. Cl.
CPC .............. *G11B 13/08* (2013.01); *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,391,108 B2 | 3/2013 | Peng et al. | |
| 9,384,770 B2 | 7/2016 | Chen et al. | |
| 9,626,991 B2 | 4/2017 | Chen et al. | |
| 9,728,209 B2 | 8/2017 | Chen et al. | |
| 10,490,214 B1 | 11/2019 | Chen | |
| 10,490,221 B1 | 11/2019 | Chen | |
| 10,832,717 B1 | 11/2020 | Cheng et al. | |
| 11,532,329 B1 * | 12/2022 | Matsumoto | G11B 13/08 |
| 2012/0263024 A1 * | 10/2012 | Jin | G11B 5/84 |
| | | | 216/22 |
| 2014/0251948 A1 * | 9/2014 | Zhao | G11B 5/314 |
| | | | 216/24 |
| 2015/0085630 A1 * | 3/2015 | Macken | G11B 5/4866 |
| | | | 369/13.33 |
| 2016/0351211 A1 * | 12/2016 | Blaber | G11B 5/6082 |
| 2019/0057717 A1 * | 2/2019 | Chen | G11B 5/314 |
| 2022/0415354 A1 * | 12/2022 | Cheng | G11B 5/6088 |

FOREIGN PATENT DOCUMENTS

WO   2016191707 A1   12/2016

* cited by examiner

*Primary Examiner* — Peter Vincent Agustin (57) ABSTRACT

A heat-assisted magnetic recording head includes a near-field transducer (NFT). The NFT includes a near-field emitter configured to heat a surface of a magnetic disk, and a plasmonic disk. The plasmonic disk is coupled to the near-field emitter and includes rhodium or iridium.

20 Claims, 5 Drawing Sheets

HEAT-ASSISTED MAGNETIC RECORDING HEAD NEAR-FIELD TRANSDUCER WITH A PLASMONIC DISK

This application claims priority to U.S. Provisional Patent Application Ser. No. 63/215,881, entitled "HEAT-ASSISTED MAGNETIC RECORDING HEAD NEAR-FIELD TRANSDUCER WITH A PLASMONIC DISK" and filed Jun. 28, 2021, the entire contents of which are hereby incorporated by reference.

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The process of generating and condensing localized surface plasmons (LSPs) on the NFT to produce the hot spot generates enormous amounts of heat which may degrade and/or deform various components of the NFT, thus potentially reducing the performance and/or life expectancy of the HAMR head and the HDD.

SUMMARY

The present disclosure describes a heat-assisted magnetic recording (HAMR) head having a near-field transducer (NFT) that includes a thermally stable plasmonic disk. The plasmonic disk includes rhodium, iridium, and/or an alloy including rhodium, iridium, gold, silver, copper, and/or aluminum. The plasmonic disk may be disposed near a portion of the NFT which typically sees the highest temperatures during a HAMR write cycle, such as near a peg of a near-field emitter. Utilizing a plasmonic disk that include rhodium, iridium, and/or an alloy including rhodium, iridium, gold, silver, copper, and/or aluminum may increase the thermal robustness of the HAMR head.

In one example, a HAMR head includes a near-field transducer including a near-field emitter configured to heat a surface of a magnetic disk; and a plasmonic disk coupled to the near-field emitter and including rhodium, iridium, and/or an alloy including rhodium, iridium, gold, silver, copper, and/or aluminum.

In another example, a HAMR head includes a near-field transducer including a near-field emitter configured to heat a surface of a magnetic disk; and a plasmonic disk coupled to the near-field emitter, wherein the plasmonic disk includes a plasmonic region including a plasmonic material; and a thermal region including rhodium, iridium, and/or an alloy including rhodium, iridium, gold, silver, copper, and/or aluminum.

These and other features and aspects of various examples may be understood in view of the following detailed discussion and accompanying drawings.

DETAILED DESCRIPTION

Figure 1:
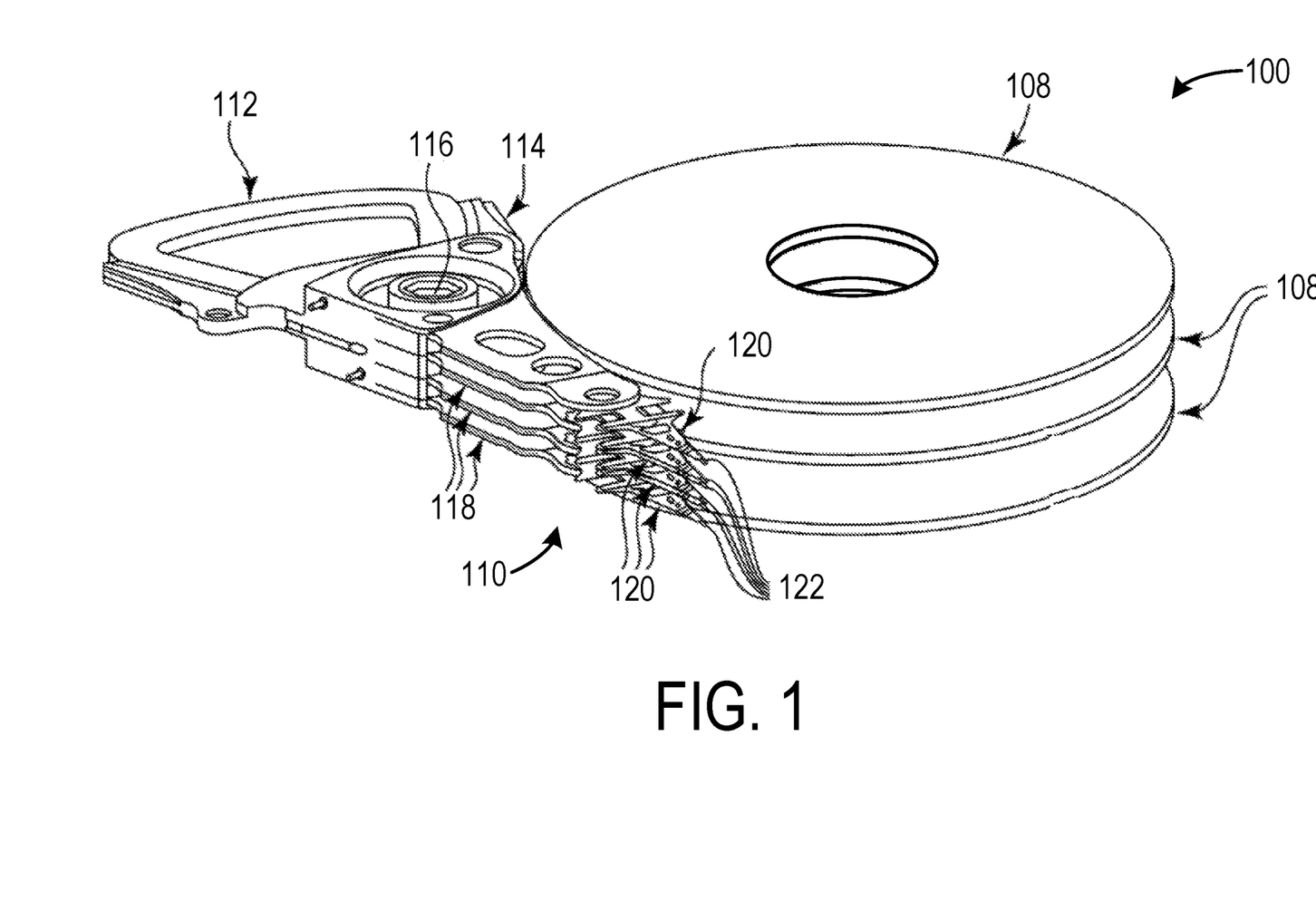
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a heat-assisted magnetic recording (HAMR) head configured to read data from and write data to a surface of a respective magnetic disk 108. In one example, each HAMR head includes a writer, a reader, a heater (e.g., a reader heater, a writer heater), and a near-field transducer (NFT).

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
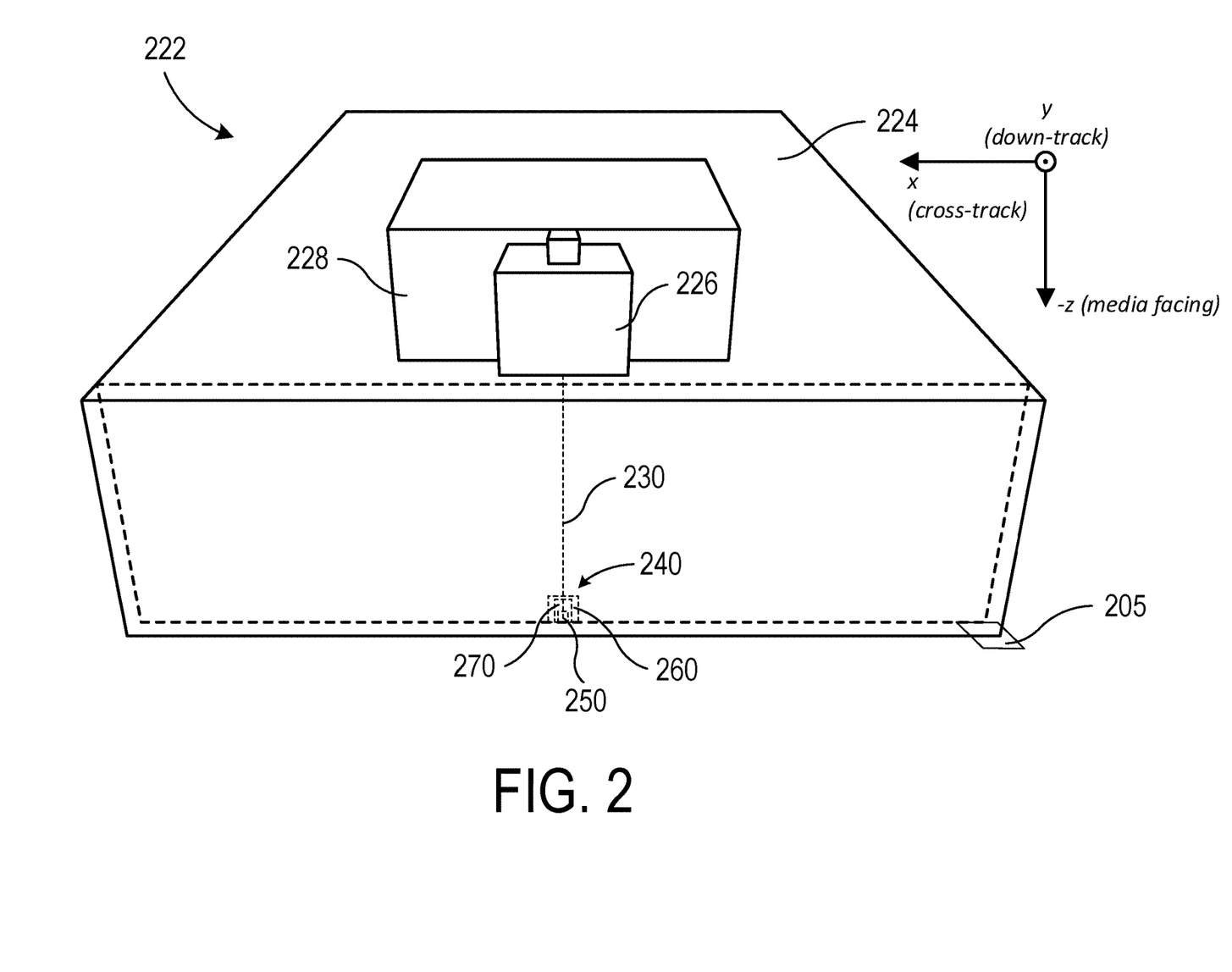
FIG. 2 is a perspective view of an example slider, in accordance with aspects of this disclosure.

FIG. 2 is a perspective view of an example slider 222, in accordance with aspects of this disclosure. Slider 222 may be an example of slider 122 of FIG. 1. Slider 222 includes a slider body 224, a laser 226, a submount 228, and a HAMR head 240. HAMR head 240 includes a waveguide 230, a near-field transducer (NFT) 250, a writer 260, and a reader 270. In the example of FIG. 2, some features or parts of features of NFT 250, writer 260, and reader 270 are presented on a media-facing air-bearing surface (ABS) 205 that is positioned over a surface of a magnetic disk (not shown) during some operations of the HDD (e.g., write operations, read operations, data maintenance operations). During such operations, ABS 205 faces and is held proximate to the moving magnetic disk surface by a cushion of gas, known as an active air bearing (AAB), that is produced from a dynamic flow of gas across a pattern of recessed subsurfaces bound within the volume of slider body 224 by ABS 205.

Laser 226 is configured to emit photons of a target wavelength. In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

Laser 226 is coupled to slider body 224 via submount 228. In the example of FIG. 2, laser 226 and submount 228 are located on a face of slider body 224 which is opposite to ABS 205. In other example HAMR sliders, a laser may be directly mounted to the slider body. Submount 228 may be configured to redirect photons output from laser 226 so that the photons are directed into waveguide 230 in the negative z-direction of FIG. 2 (e.g., toward NFT 250). The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to create a small hot spot on a magnetic disk. For example, NFT may generate and support a distribution of localized surface plasmons (LSPs) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and aim the magnetic field at the hot spot on the magnetic disk. The near-field energy heats and lowers the coercivity of the magnetic grains in the hot spot, thereby enabling magnetic moments of these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the magnetic moment orientation induced by the magnetic field generated by writer 260, thus preserving the bits of written data.

Figure 3:
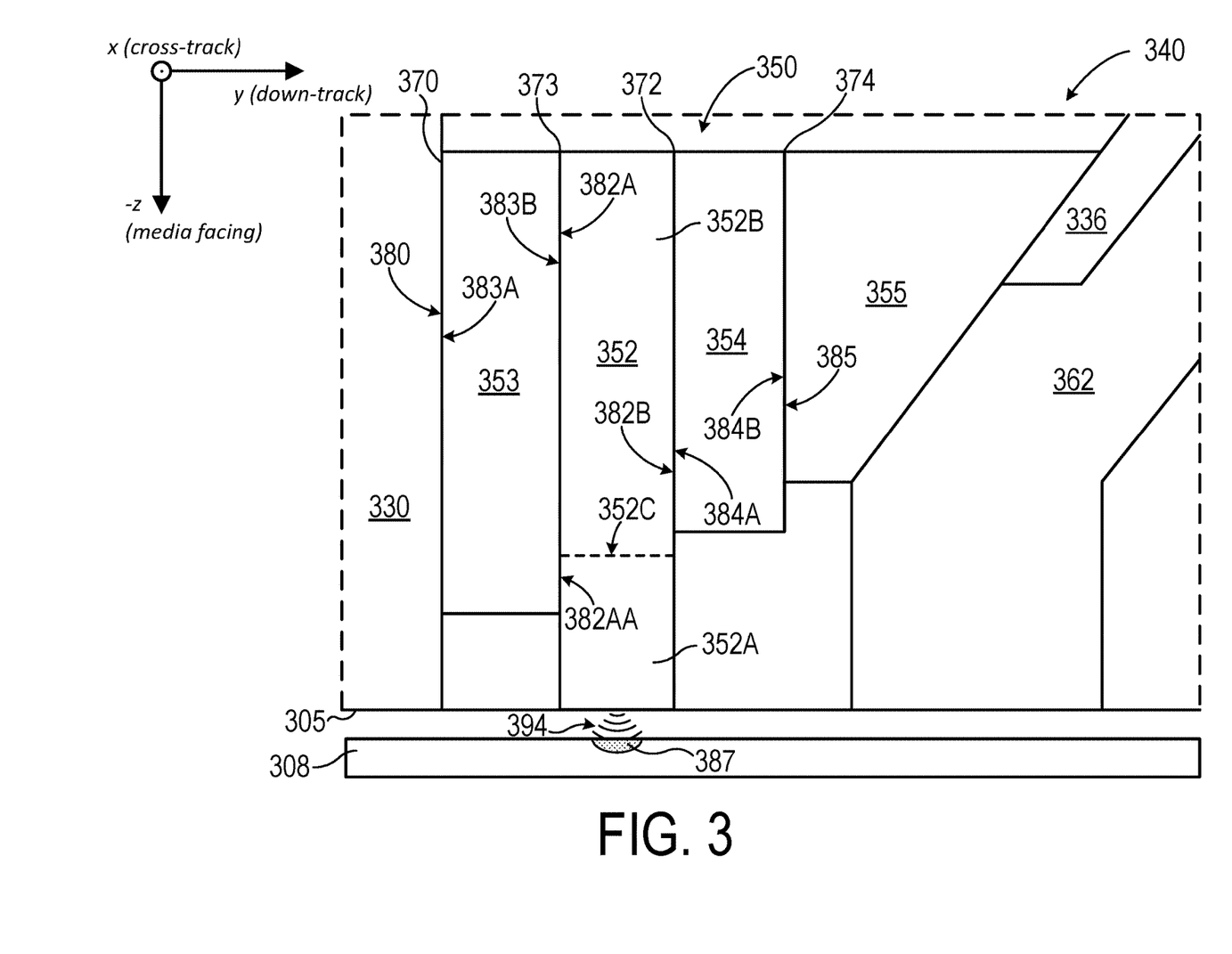
FIG. 3 is a cross-sectional view of an example HAMR head, in accordance with aspects of this disclosure.

FIG. 3 is a cross-sectional view of an example HAMR head, in accordance with aspects of this disclosure. HAMR head 340 includes a waveguide 330, an NFT 350, a write pole 362, and a diffuser 336.

A light source, such as laser 226 of FIG. 2, emits photons of a target wavelength range (e.g., near infrared, visible). In some instances, laser 226 emits a distribution of photons with a median wavelength of approximately 800 nm to approximately 900 nm. Waveguide 330 is configured to support LSP generation on NFT 350 by directing photons from the light source toward NFT 350. In some examples, a waveguide includes at least two layers that include different materials. Waveguide 330, for example, may include a waveguide core and a core-to-NFT spacing (CNS) layer. In one example, a material of a first layer has a refractive index that is different than the refractive index of a material of a second layer. In some examples, the momentum of an incident photon in a first material is shifted upon transmission into a second material, which may be caused by the difference in the refractive indices of the materials of the first and second layers.

LSPs are generated on NFT 350 through resonance coupling of photons from the light source with free electrons of NFT 350. NFT 350 is configured to condense LSPs of NFT 350, amplify a near field of the LSPs, and emit a near-field 394 to produce a hot spot 387 on a magnetic disk 308. Near-field 394 and a magnetic field from write pole 362 are directed to be partially coincident on spot 387 such that the temperature increase resulting from near-field 394 reduces the magnetic coercivity of the grains within hot spot 387 and enables the magnetic field from write pole 362 to orient magnetic moments of the grains more easily, thus producing more stable bits of written data upon cooling.

NFT 350 may include a heat sink 355 that is configured to draw heat away from regions of NFT 350 and direct the heat toward other regions of HAMR head 340. In the example of HAMR head 340, heat sink 355 is coupled to diffuser 336. Heat sink 355 may include a thermally conductive material, such as gold. Including a material with high thermal conductivity in heat sink 355 may improve heat dissipation away from thermally sensitive regions of NFT 350.

In some examples, heat sink 355 includes a thermally stable material. Examples of thermally stable materials include rhodium, copper, tungsten, tantalum, iridium, platinum, ruthenium, nickel, and iron. Including one or more thermally stable materials in heat sink 355 may improve the ability of heat sink 355 to dissipate heat more effectively and/or consistently and may extend the lifetime of HAMR head 340. In some examples, including one or more thermally stable materials in heat sink 355 may improve its resistance to thermal defects such as voiding, deformation, recession, and/or delamination from other surrounding features.

Diffuser 336 is a heat sink that is configured to draw heat from NFT 350 and dissipate the heat toward other areas of HAMR head 340 (e.g., toward other heat sinks). Diffuser 336 may include a thermally conductive material and/or a thermally stable material. In some examples, drawing heat away from regions of an NFT which are prone to thermal degradation may reduce defect formation and/or extend the operating lifetime of the HAMR head.

NFT 350 may include a middle disk (MDSC) 354. MDSC 354 is configured to direct LSPs toward an emitting region of a respective near-field emitter 352 and/or mitigate background fields. MDSC 354 may include a thermally conductive material (e.g., gold) and/or a thermally stable material (e.g., iridium, rhodium). In the example of FIG. 3, heat sink 355 and MDSC are coupled to each other at interface 374. Interface 374 may be substantially orthogonal to air-bearing surface 305 and includes a surface 384B of MDSC and a surface 385 of heat sink 355.

NFT 350 includes a near-field emitter 352. Near-field emitter 352 is configured to emit near-field 394 to produce hot spot 387 on magnetic disk 308. In the example of FIG. 3, MDSC 354 and near-field emitter 352 are coupled to each other at interface 372. In some examples, interface 372 is substantially orthogonal to air-bearing surface 305 and includes a surface 382B of near-field emitter 352 and a surface 384A of MDSC 354.

Near-field emitter 352 may include a peg 352A and a disk 352B. Peg 352A is disposed near air-bearing surface 305 of HAMR head 340. In some instances, one or more portions of peg 352A are exposed on air-bearing surface 305. In some examples, disk 352B is coupled to peg 352A and is disposed behind peg 352A relative to air-bearing surface 305 (e.g., in the z-direction). Disk 352B is configured to serve as an anchor for peg 352A. Peg 352A may be narrower in profile than disk 352B. In some examples, near-field emitter 352 is a single feature, with peg 352A and disk 352B being two regions of a continuous piece. In these examples, near-field emitter 352 may taper or narrow toward peg 352A. Peg 352A may protrude from disk 352B in the vicinity of air-bearing surface 305.

In other examples, peg 352A and disk 352B are separate, discrete features separated by a defined interface 352C. In examples where peg 352A and disk 352B are two regions of a continuous piece, peg 352A and disk 352B may include the same material(s). For example, peg 352A and disk 352B may both include iridium, rhodium, ruthenium, or a gold alloy. In some examples, peg 352A and disk 352B include different materials (e.g., different elements, different alloys, different composites). For example, peg 352A may include iridium, ruthenium, a gold alloy, or a gold composite, and disk 352B may include gold or a different gold alloy or gold composite than peg 352A (e.g., a gold alloy with a different alloying metal, a gold alloy with a different concentration of the same alloying metal that peg 352A includes).

Disk 352B is configured to receive and support a distribution of LSPs. In some examples, disk 352B is configured to participate in LSP generation. Peg 352A is configured to emit near-field 394 to generate hot spot 387 on magnetic disk 308. For example, peg 352A may generate hot spot 387 by receiving and condensing a distribution of LSPs, amplifying a near-field of the LSP distribution, and emitting amplified near-field 394 toward the surface of magnetic disk 308.

NFT 350 includes a plasmonic disk 353. Plasmonic disk 353 is configured to generate and support LSPs through resonance coupling with incident photons which are generated by a light source (e.g., laser 226 of FIG. 2) and are directed toward NFT 350 by waveguide 330.

Materials which are commonly included in HAMR NFTs (e.g., gold) are often prone to thermal defects, instability, and degradation at temperatures which are encountered by the HAMR head under normal operating conditions. Repeated and prolonged thermal exposure of the NFT may lead to thermal degradation, physical defects, deformation, and/or recession of its features. Such degradation and defects may reduce the performance and/or shorten the lifetime of a HAMR head, as well as potentially increase the laser power required to maintain the LSP density needed for HDD operation, which may further accelerate defect formation and migration.

In accordance with aspects of this disclosure, plasmonic disk 353 includes a more thermally robust material relative to plasmonic disks of other HAMR heads. Examples of thermally robust materials include rhodium, iridium, and alloys including rhodium, iridium, gold, silver, copper, and/or aluminum. An alloy of plasmonic disk 353 may include rhodium, iridium, gold, silver, copper, and/or aluminum as a primary material (e.g., a material that constitutes a majority of the composition of plasmonic disk 353), and one or more alloying metals. In some examples, the inclusion of an alloying metal in a primary material of plasmonic disk 353 improves the thermal robustness of plasmonic disk 353 (e.g., by impeding defect formation and migration, by stabilizing grain size). Examples of alloying metals include rhodium, copper, tungsten, tantalum, iridium, platinum, nickel, bismuth, indium, tin, manganese, holmium, lutetium, praseodymium, scandium, uranium, barium, cesium, dysprosium, europium, rubidium, terbium, gadolinium, samarium, thallium, cadmium, neodymium, lead, hafnium, niobium, erbium, magnesium, palladium, vanadium, zinc, chromium, iron, lithium, sodium, strontium, calcium, yttrium, thorium, beryllium, thulium, ytterbium, promethium, neodymium, cobalt, cerium, and lanthanum.

Utilizing more thermally robust materials in plasmonic disk 353 may provide better thermal stability than a plasmonic disk that includes gold and/or another thermally sensitive material alone. Improved thermal stability of plasmonic disk 353 may include resistance to defects such as voiding, interface delamination, and feature recession. That is, the shape of a plasmonic disk 353 may be better preserved under extended thermal exposure than that of a similarly shaped plasmonic disk which does not include a thermally robust material.

Plasmonic disk 353 is coupled to near-field emitter 352 and waveguide 330. Plasmonic disk 353 and near-field emitter 352 are coupled to each other at an interface 373. In some examples, interface 373 is substantially orthogonal to air-bearing surface 305. Interface 373 includes a surface 383B of plasmonic disk 353 and a surface 382A of near-field emitter 352. In some examples, surface 383B includes rhodium, iridium, and/or an alloy including rhodium, iridium, gold, silver, copper, and/or aluminum. Surface 382A, and thus interface 373, may include a surface 382AA of peg 352A of near-field emitter 352.

Plasmonic disk 353 and waveguide 330 are coupled to each other at an interface 370. Interface 370 may be substantially orthogonal to air-bearing surface 305. Interface 370 includes a surface 380 of waveguide 330 and a surface 383A of plasmonic disk 353. In some examples, surface 383A of plasmonic disk 353 includes rhodium, iridium, and/or an alloy including rhodium, iridium, gold, silver, copper, and/or aluminum. Including rhodium, iridium, and/or an alloy including rhodium, iridium, gold, silver, copper, and/or aluminum on surface 383A may enable plasmonic disk 353 to be directly coupled to waveguide 330 without the need for an adhesion layer. In some instances, coupling plasmonic disk 353 directly to waveguide 330 may provide more efficient LSP generation, lower laser power, and/or lower operating temperature than an NFT which includes an adhesion layer disposed between a plasmonic disk and a waveguide.

Disk 352B of near-field emitter 352 may be wide with large areas of contact with surrounding features (e.g., with plasmonic disk 353, with MSDC 354). In contrast, peg 352A may be narrow and substantially isolated from surrounding features. Such physical aspects of peg 352A may enhance the amplification of a near-field and, in some examples, may enable a high thermal gradient of hot spot 387. However, these aspects may also produce difficulty in dissipating generated heat away from peg 352A. As such, peg 352A and portions of surrounding features which are disposed proximate to peg 352A may experience much higher temperatures than other regions of HAMR head 340. Including thermally robust materials in these features and portions may, in some examples, provide the features with improved resistance to thermal defects and may extend the operating lifetime of HAMR heat 340. For example, a portion of plasmonic disk 353 which is proximate to surface 382AA of peg 352A may particularly benefit from the inclusion of such thermally robust materials. In one example, surface 383B of plasmonic disk 353 includes rhodium, iridium, and/or an alloy including rhodium, iridium, gold, silver, copper, and/or aluminum. Including one or more of these thermally robust materials in the portion of surface 383B which is coupled to surface 382AA of peg 352A may improve the thermal robustness of this portion of interface 373.

Figure 4:
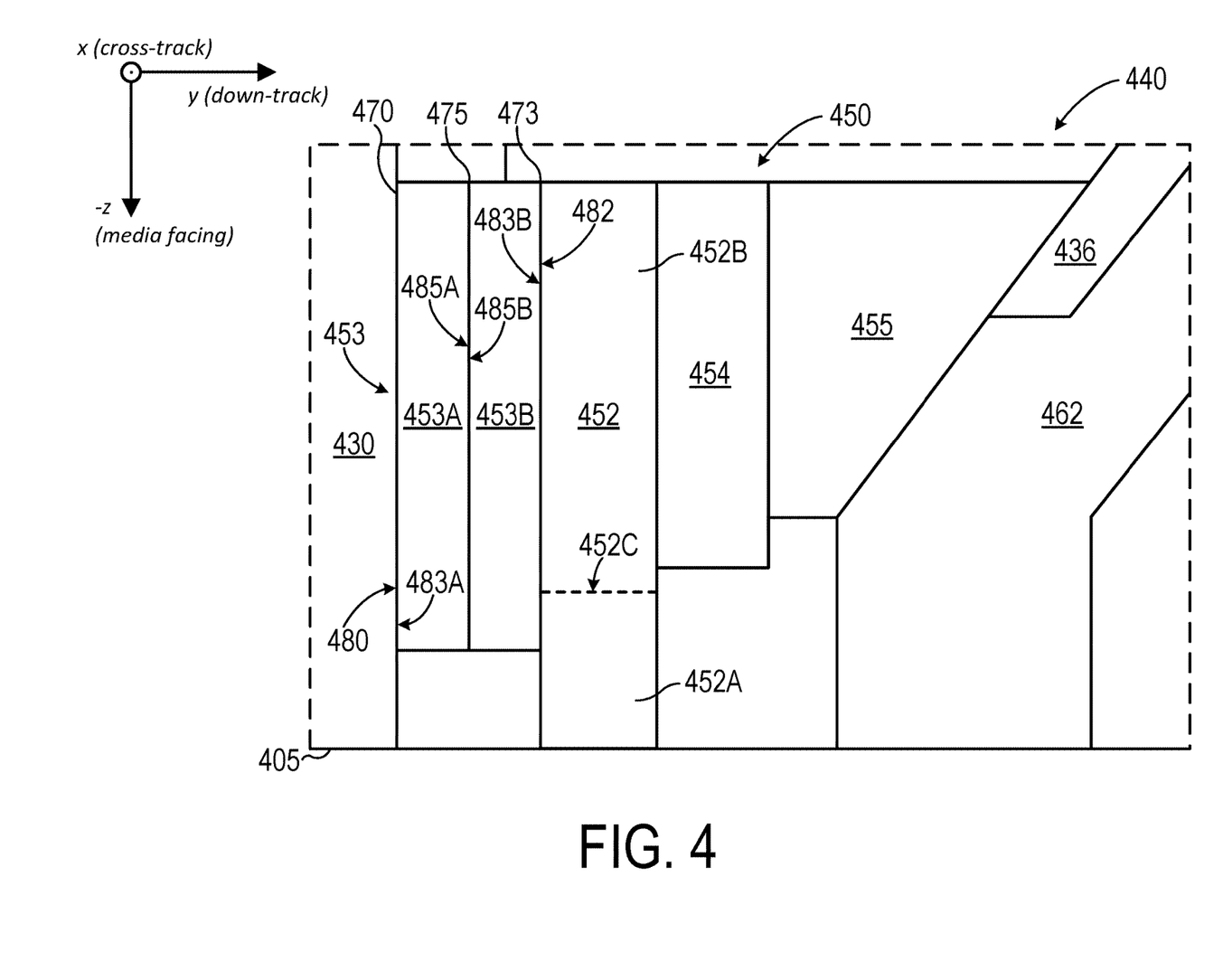
FIG. 4 is a cross-sectional view of an example HAMR head, in accordance with aspects of this disclosure.

FIG. 4 is a cross-sectional view of an example HAMR head, in accordance with aspects of this disclosure. HAMR head 440 includes a waveguide 430, an NFT 450, a write pole 462, and a diffuser 436. NFT 450 includes a near-field emitter 452 and a plasmonic disk 453. NFT 450 may include a MDSC 454 and/or a heat sink 455. Near-field emitter 452 includes a peg 452A and a disk 452B. In some examples, peg 452A and disk 452B are two regions of a single, continuous near field emitter 452. In other examples, peg 452A and disk 452B are separate, discrete features separated by a defined interface 452C. In some examples, peg 452A and disk 452B include different materials.

Plasmonic disk 453 includes a plasmonic region 453A and a thermal region 453B. Thermal region 453B includes rhodium, iridium, and/or an alloy including rhodium, iridium, gold, silver, copper, and/or aluminum.

Plasmonic region 453A includes a plasmonic material. As used herein, a plasmonic material is a material which possesses properties (e.g., electrical properties, optical properties) which promote resonance coupling between photons incident upon the plasmonic material and free electrons of the plasmonic material. Such resonant coupling of a photon with free electrons of the plasmonic material may excite one or more plasmonic modes of the plasmonic material, which may result in the generation of an LSP on a surface of the plasmonic material. Plasmonic materials which demonstrate efficient plasmon generation in response to photons of a wavelength target or range are said to have a high plasmonic figure of merit.

In some examples, the plasmonic material includes gold, silver, ruthenium, copper, aluminum, and/or rhodium. The plasmonic material may further include a secondary atom or material which is configured to provide thermal stability to the plasmonic region. Examples of secondary materials include alloying metals and nanoparticles. Examples of nanoparticles include yttrium oxide nanoparticles and transparent conductive oxide (TCO) nanoparticles such as zinc oxide nanoparticles. For example, the plasmonic material included in the plasmonic region may be an alloy such as a gold alloy or a silver alloy, or it may be a plasmonic metal and nanoparticle dispersion (e.g., gold with dispersed nanoparticles, such as yttrium oxide nanoparticles or zinc oxide nanoparticles).

In some examples, the material included in plasmonic region 453A is different from the material included in the thermal region 453B. In some examples, one material may be different from another material if the materials include different elements (e.g., a first material is gold and a second material is rhodium). In another example, one material may be different from another material if the materials include different concentrations of the same elements or different phases of the same elements. In other words, a material such as an alloy or a composite which is used in both the thermal region and the plasmonic region is considered different if the relative concentrations of its included materials are different in each region. For example, plasmonic region 453A may both include a material AuRh (e.g., 90% gold, 10% rhodium) and thermal region 453B may include a different material AuRh (30% gold and 70% rhodium).

Plasmonic region 453A and thermal region 453B are coupled to each other at an interface 475 and are provided in a layered configuration. The layered configuration is oriented along an axis which is substantially parallel to an air-bearing surface 405 (e.g., the down-track y axis). Interface 475 may be substantially orthogonal to air-bearing surface 405. Interface 475 includes a surface 485A of plasmonic region 453A and a surface 485B of thermal region 453B.

Plasmonic disk 453 and waveguide 430 are coupled to each other at an interface 470. Interface 470 may be substantially orthogonal to air-bearing surface 405. Interface 471 includes a surface 480 of waveguide 430 and a surface 483A of plasmonic region 453A of plasmonic disk 453. That is, surface 483A of plasmonic region 453A is coupled to surface 480 of waveguide 430. In some examples, surface 483A of plasmonic region 453A includes gold, silver, ruthenium, copper, aluminum, or combinations thereof. Providing plasmonic region 453A in a portion of plasmonic disk 453 that is coupled to waveguide 430 may, in some instances, improve the plasmonic efficiency (e.g., plasmonic figure or merit) of NFT 450.

Thermal region 453B of plasmonic disk 453 is coupled to near-field emitter 452 at interface 473. Interface 473 include a surface 483B of thermal region 453B and a surface 482 of near-field emitter 452. Surface 483B of thermal region 453B is coupled to surface 482 of near-field emitter 452. In some examples, thermal region 453B is proximate to peg 452A of near-field emitter 452.

A plasmonic disk which includes a plasmonic region and a thermal region may demonstrate better thermal robustness than a plasmonic disk that includes a single region. In some examples, including a thermal region in a plasmonic disk may reduce thermal defects such as deformation, voiding, interface delamination, and/or feature recession. Including a thermal region that is disposed between a plasmonic region of the plasmonic disk and a near-field emitter may reduce the operating temperature of the plasmonic disk under operation. In some instances, a plasmonic disk which includes a plasmonic region and a thermal region may increase the operating life of the HAMR head in which it is included.

Figure 5:
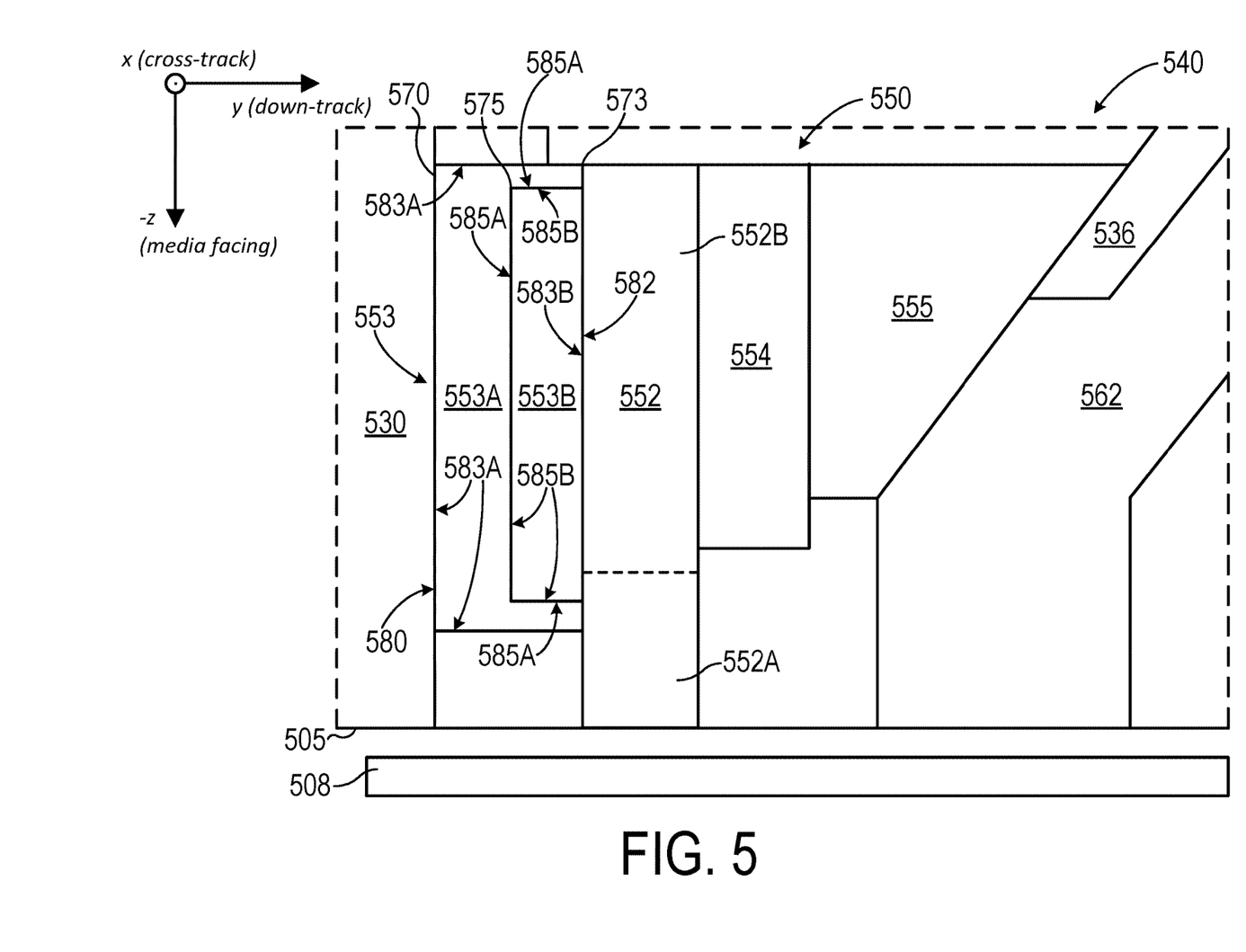
FIG. 5 is a cross-sectional view of an example HAMR head, in accordance with aspects of this disclosure.

FIG. 5 is a cross-sectional view of an example HAMR head, in accordance with aspects of this disclosure. HAMR head 540 includes a waveguide 530, an NFT 550, a write pole 562, and a diffuser 536. NFT 550 includes a near-field emitter 552 and a plasmonic disk 553 and may include a MDSC 554 and/or a heat sink 555. Near-field emitter 552 includes a peg 552A and a disk 552B.

Plasmonic disk 553 includes a plasmonic region 553A and a thermal region 553B. Thermal region 553B is a protrusion from a surface 582 of near-field emitter 552. The protrusion of thermal region 553B includes an outer surface 585B that encloses a volume of thermal region 553B. Plasmonic region 553A includes an inner surface 585A and an opposite outer surface 583A. Plasmonic region 553A and thermal region 553B are coupled to each other at an interface 575. Interface 575 includes inner surface 585A of plasmonic region 553A and outer surface 585B of thermal region 553B. That is, plasmonic region 553A encloses thermal region 553B along interface 575. A plasmonic disk which includes a plasmonic region that encloses a thermal region may demonstrate better thermal stability than a plasmonic disk which does not include a plasmonic region that encloses a thermal region.

Plasmonic disk 553 is coupled to near-field emitter 552 at an interface 573. Interface 573 includes a surface 583B of plasmonic disk 553 and a surface 582 of near-field emitter 552. A portion of interface 573 includes an interface between thermal region 553B and peg 552A of near-field emitter 552. Surface 583B includes surfaces of both plasmonic region 553A and thermal region 553B. In other words, in the example of NFT 550, both plasmonic region 553A and thermal region 553B are coupled to near-field emitter 552, and plasmonic region 553A encloses thermal region 553B.

Plasmonic region 553A and waveguide 530 are coupled to each other at an interface 570. Interface 570 includes at least a portion of outer surface 583A of plasmonic region 553A and at least a portion of a surface 580 of waveguide. Coupling a plasmonic region of a plasmonic disk to a waveguide may, in some examples, provide more efficient plasmon generation than a plasmonic disk which does not have a plasmonic region coupled to a waveguide.

What is claimed is:

1. A heat-assisted magnetic recording head comprising a near-field transducer comprising:
   a near-field emitter configured to heat a surface of a magnetic disk; and
   a plasmonic disk coupled to the near-field emitter and comprising at least one of rhodium or iridium,
   wherein the plasmonic disk and the near-field emitter are coupled to each other at an interface which is substantially orthogonal to an air-bearing surface of the heat-assisted magnetic recording head,
wherein the interface comprises a surface of the plasmonic disk and a surface of the near-field emitter, and
wherein the surface of the plasmonic disk comprises rhodium, iridium, and/or an alloy comprising rhodium, iridium, gold, silver, copper, and/or aluminum.

2. The heat-assisted magnetic recording head of claim 1 comprising a waveguide,
wherein the surface of the plasmonic disk is a first surface,
wherein the plasmonic disk and the waveguide are coupled to each other at an interface which is substantially orthogonal to the air-bearing surface, and
wherein the interface comprises a surface of the waveguide and a second surface of the plasmonic disk.

3. The heat-assisted magnetic recording head of claim 2, wherein the second surface of the plasmonic disk comprises rhodium, iridium, and/or an alloy comprising rhodium, iridium, gold, silver, copper, and/or aluminum.

4. The heat-assisted magnetic recording head of claim 1, wherein the near-field emitter comprises:
a disk; and
a peg,
wherein the plasmonic disk and the near-field emitter are coupled to each other at an interface which is substantially orthogonal to an air-bearing surface of the heat-assisted magnetic recording head, and
wherein the interface comprises a surface of the plasmonic disk and a surface the peg of the near-field emitter.

5. The heat-assisted magnetic recording head of claim 4, wherein the surface of the plasmonic disk comprises at least one of rhodium or iridium.

6. The heat-assisted magnetic recording head of claim 4, wherein the near-field emitter is a single feature, with the peg and the disk being two regions of a continuous piece.

7. The heat-assisted magnetic recording head of claim 4, wherein the disk and the peg are separate, discrete features separated by a defined interface.

8. The heat-assisted magnetic recording head of claim 1, wherein the near-field transducer further comprises a middle disk,
wherein the middle disk and the near-field emitter are coupled to each other at an interface which is substantially orthogonal to an air-bearing surface of the heat-assisted magnetic recording head, and
wherein the interface comprises a surface of the near-field emitter and a surface of the middle disk.

9. The heat-assisted magnetic recording head of claim 8, wherein the surface of the middle disk is a first surface,
wherein the interface is a first interface,
wherein the near-field transducer further comprises a heat sink,
wherein the heat sink and the middle disk are coupled to each other at a second interface which is substantially orthogonal to the air-bearing surface, and
wherein the second interface comprises a second surface of the middle disk and a surface of the heat sink.

10. A heat-assisted magnetic recording head comprising a near-field transducer comprising:
a near-field emitter configured to heat a surface of a magnetic disk; and
a plasmonic disk coupled to the near-field emitter,
wherein the plasmonic disk comprises:
a plasmonic region comprising a plasmonic material; and
a thermal region comprising a material that is different from the plasmonic material,
wherein the plasmonic region and the thermal region are coupled to each other and provided in a layered configuration,
the layered configuration oriented along an axis which is substantially parallel to an air-bearing surface of the heat-assisted magnetic recording head.

11. The heat-assisted magnetic recording head of claim 10, wherein the plasmonic material comprises gold, silver, ruthenium, copper, aluminum, or combinations thereof.

12. The heat-assisted magnetic recording head of claim 10, wherein the material of the thermal region comprises at least one of rhodium, iridium, or an alloy comprising rhodium, iridium, gold, silver, copper, and/or aluminum.

13. The heat-assisted magnetic recording head of claim 10,
wherein the plasmonic region and the thermal region are coupled to each other at an interface which is substantially orthogonal to an air-bearing surface of the heat-assisted magnetic recording head, and
wherein the interface comprises:
a surface of the plasmonic region; and
a surface of the thermal region.

14. The heat-assisted magnetic recording head of claim 13 comprising a waveguide,
wherein the surface of the plasmonic region is a first surface of the plasmonic region,
wherein the surface of the thermal region is a first surface of the thermal region,
wherein a second surface of the plasmonic region is coupled to a surface of the waveguide, and
wherein a second surface of the thermal region is coupled to a surface of the near-field emitter.

15. The heat-assisted magnetic recording head of claim 10 comprising a waveguide,
wherein the plasmonic disk and the waveguide are coupled to each other at an interface which is substantially orthogonal to an air-bearing surface, and
wherein the interface comprises a surface of the waveguide and a surface of the plasmonic disk, and
wherein the surface of the plasmonic disk is a surface of the plasmonic region.

16. The heat-assisted magnetic recording head of claim 15, wherein the surface of the plasmonic region comprises gold, silver, ruthenium, copper, aluminum, or combinations thereof.

17. A heat-assisted magnetic recording head comprising a near-field transducer comprising:
a near-field emitter configured to heat a surface of a magnetic disk; and
a plasmonic disk coupled to the near-field emitter,
wherein the plasmonic disk comprises:
a plasmonic region comprising a plasmonic material; and
a thermal region comprising a material that is different from the plasmonic material,
wherein the thermal region is a protrusion from a surface of the near-field emitter, the protrusion comprising an outer surface that encloses a volume of the thermal region.

18. The heat-assisted magnetic recording head of claim 17,
wherein the plasmonic region comprises:
an inner surface; and
an outer surface opposite the inner surface, wherein the plasmonic region and the thermal region are coupled to each other at an interface, and
wherein the interface comprises:
the inner surface of the plasmonic region; and
the outer surface of the thermal region.

19. The heat-assisted magnetic recording head of claim 17, wherein the plasmonic material comprises gold, silver, ruthenium, copper, aluminum, or combinations thereof.

20. The heat-assisted magnetic recording head of claim 17, wherein the material of the thermal region comprises at least one of rhodium, iridium, or an alloy comprising rhodium, iridium, gold, silver, copper, and/or aluminum.

* * * * *